Patented Nov. 29, 1949

2,489,307

UNITED STATES PATENT OFFICE 2,489,307

POLISHING MATERIAL

John B. Miller, Lewiston, N. Y., assignor, by mesne assignments, to National Lead Company, New York, N. Y., a corporation of New Jersey No Drawing. Application May 17, 1947, Serial No. 748,845

3 Claims. (Cl. 51—309)

The present invention relates to an improved method for the preparation of highly purified zirconium dioxide product suitable for use as a polishing agent suitable as, for instance, for polishing glass.

Heretofore, zirconium oxide and cerium oxide offered the sources of colorless materials employed in polishing glass and for many purposes had supplanted rouge. The trade requirements for a good polishing material were such that only highly purified zirconium dioxide of the type produced by controlled precipitation from chemically pure water soluble salts of zirconium could meet the specification. The difficulty and expense of preparing a pure source for the zirconium dioxide militated against the use of the latter as a glass polishing agent.

In a copending application for patent filed May 6, 1947, under Serial No. 746,401, entitled "Polishing material," now abandoned, there is described an improved procedure whereby zirconium dioxide obtained by the burning of zirconium cyanonitride may be processed to prepare an acceptable polishing material. That procedure involves an initial calcination of zirconium dioxide obtained from zirconium cyanonitride as source materal at a temperature of above about 1050° C. and preferably about 1300° C., and thereafter subjecting the so calcined material first to a dry grinding operation and subsequently to a wet grinding operation until the material has been reduced in size to less than 5 microns.

Although in the operation of the invention described and claimed in said Serial No. 746,401, an excellent end product is obtained, the procedure is not as efficient as might be desired since during the wet milling a substantial amount of material is classified as greater than 5 microns in size and must be returned to the wet grinding operation for reprocessing.

It is an object of the present invention to provide a procedure for preparing zirconium dioxide of sufficient purity and fineness to be acceptable as a polishing agent by a procedure which is somewhat more efficient than those heretofore suggested.

In accordance with the present invention, zirconium dioxide is first prepared from the usual source zircon, or zirconium silicate, by reduction in the presence of carbon and air with the formation of complex carbon and nitrogen compounds designated as zirconium cyanonitride. This process is preferably performed in accordance with the procedure outlined in U. S. Patent No. 2,270,527 of January 20, 1942, granted to Charles J. Kinzie, Robert P. Easton and Viatcheslav V. Efimoff. As there outlined, the zirconium cyanonitride is burned to zirconium oxide and the latter size graded to less than 35 mesh.

Due to the presence in the end product of said Kinzie et al. Patent No. 2,270,527, of a considerable amount of carbon, which represents relatively large quantities of cyanonitride, dry grinding of said product is not feasible by reason of the extreme inflammability of zirconium cyanonitride. In accordance with the present invention, therefore, the zirconium dioxide prepared from the cyanonitride was subjected to a high temperature calcination. In order suitably to prepare such material for subsequent processing, the calcination must be performed above 1050° C. and preferably at about 1300° C. Calcination at a temperature lower than about 1050° C. will not produce a product from which acceptable polishing agent can be prepared. While it is not known what change occurs during the calcination, it is sufficiently profound at 1300° C. to change the color and the fineness of the product.

Furthermore, the so calcined material may be safely further dry milled without explosion or fire hazard.

The process of the present invention is preferably practiced as follows:

A zirconium oxide conglomerate is prepared from zirconium cyanonitride substantially in accordance with the disclosures of said U. S. Patent 2,270,527. The resulting zirconium oxide of less than 35 mesh is then calcined at a temperature above 1050° C., and preferably at about 1300° C. This operation may preferably be performed by feeding the impure zirconium dioxide into a 40 foot rotary tube calciner of a diameter of 7 feet, at a rate of about 1500 pounds per hour and subjecting the same to a temperature of about 1300° C. The hot calcined zirconium dioxide discharged from the kiln is then cooled, preferably by passage through a revolving cooler, whereby the temperature of the calcined material is reduced to a convenient handling temperature.

The cooled product is thereafter passed through a dry grinding mill, preferably of the continuous discharge type, which mill is preferably lined with porcelain brick and loaded with a charge of porcelain balls serving as a grinding media. Associated with the mill circuit is a conventional air classification system which automatically classifies the dry discharge into — 44 micron material and a +44 micron material, the latter being automatically returned to the feed circuit.

It has been found, in accordance with the present invention, that better efficiencies are obtained in the subsequent wet milling if the −44 micron product is calcined at a temperature of about 1050° C., more or less, in the presence of an alkali. The alkali may be any caustic water-soluble alkali as, for instance, caustic soda, caustic potash or soda ash. The mount of alkali employed is about 1–3% of the weight of the zirconium dioxide. There is also included a small amount of sodium nitrate which aids in conditioning the charge. Some of the alkali appears to react with other ingredients of the charge to form alkali-containing meterial of complex composition which is not freed completely of akali during the subsequent wet processing. A typical sample for futher process will be made up as follows:

A charge is prepared consisting of 1500 pounds of dry milled zirconia of a size less than 44 microns, 25 pounds soda ash and 25 pounds sodium nitrate. This charge is mixed in a mechanical mixer and then fed into a rotary tube furnace at the rate of about 1500 pounds per hour, the batch being calcined during passage through the furnace at a temperature of about 1050° C., although the temperature may be somewhat higher. The so calcined batch is then cooled in any conventional way, mixed with water and wet ground. The calcination with soda ash appears to increase the facility with which the product may be wet milled since the effluent from the mill, when classified in a conventional hydraulic classifier to a product less than 5 microns and an overage product of greater than 5 microns, produces about 50% of the desired −5 micron product in one pass. The oversize material from the wet classification is returned to the feed for recycling, the −5 micron product being all blended, then dried and disintegrated for packaging.

The product obtained by this operation possesses a composition as follows:

| | Per cent |
|---|---|
| Silica | 5.84 |
| Sodium oxide | 0.40 |
| $TiO_2$ | 0.35 |
| Carbon | 0.011 | with traces of minor impurities, the balance being zirconium dioxide. When according to the conventional practice during analysis, red lead is mixed with the product to decompose otherwise stable carbides, then the carbon content was found to be 0.038%. The end product is a light cream colored powder of uniform size having a particle size between 0.5 and 5 microns, which can be produced economically and which possess satisfactory polishing characteristics.

What is claimed is:

1. The process for the production of finely divided zirconium oxide suitable as a glass polishing agent which comprises first calcining oxidized zirconium cyanonitride at a temperature above 1050° C., thereafter dry milling the calcined product to less than 44 microns, mixing said −44 micron material with a caustic alkali in an amount to yield about 1% $Na_2O$ in the mix, calcining said mix at about 1050° C., and thereafter wet grinding and classifying said material to a size less than 5 microns.

2. The process for the production of finely divided zirconium oxide suitable as a glass polishing agent which comprises first calcining oxidized zirconium cyanonitride at a temperature above 1050° C., thereafter dry milling the calcined product to less than 44 microns, mixing said −44 micron material with sufficient sodium nitrate and soda ash to yield a product containing water-insoluble compounds containing combined therewith about 0.40% $Na_2O$, subjecting such mix to calcination at a temperature of about 1050° C., and thereafter wet grinding said calcined mix and classifying the same to a product, all of which is less than about 5 microns.

3. The process of preparing a finely divided zirconium oxide polishing agent which consists in calcining oxidized zirconium cyanonitride at about 1300° C., dry milling the calcined product to less than 44 microns size, mixing the resulting product with caustic alkali predetermined in amount to yield about 1% of alkali oxide in the mixture, recalcining said mixture at about 1050° C., wet grinding the resulting product and classifying to a size desired for polishing purposes.

JOHN B. MILLER.

REFERENCES CITED

The following references are of record in the file of this patent:

UNITED STATES PATENTS

| Number | Name | Date |
|---|---|---|
| 1,502,422 | Cooper | July 22, 1924 |
| 2,315,519 | Hake et al. | Apr. 6, 1943 |